UNITED STATES PATENT OFFICE 2,174,920

PIGMENT

Max H. Kliefoth, Madison, Wis., assignor, by mesne assignments, to The Sherwin-Williams Company, Cleveland, Ohio, a corporation of Ohio No Drawing. Application May 25, 1937,
Serial No. 144,758

5 Claims. (Cl. 134—58)

This invention relates to mechanically mixed pigments consisting of titanium oxide and alkaline earth metal sulfates. These mechanically blended pigments have a high tinting strength and are an improvement on these previously produced by the so-called coalescing process.

I have found that when certain types of titanium oxide and alkaline earth metal sulfate pigments are mechanically mixed such mixtures have a tinting strength and hiding power which is greater than the mixtures produced by precipitating the alkaline earth metal sulfates onto the titanium oxide. They also show a superior color as determined by the Hunter reflectometer. The precipitating or coalescing process has been extensively used in the manufacture of such pigments. These alkaline earth sulfates are limited to the calcium and barium base pigments because of the cost of the strontium sulfate and the water solubility of the magnesium sulfate.

I have found that when the titanium oxide pigment produced by the method of the Svendsen Patent No. 2,042,435, May 26, 1936, is mechanically mixed with an alkaline earth metal sulfate produced by a precipitation process a superior extended pigment is formed. Both the titanium oxide and the alkaline earth sulfate and particularly the barium sulfate produced in this way are extremely finely divided, substantially all of the individual particles being less than 0.50 micron in size, at least 80% of titanium oxide and at least 90% of the barium sulfate particles being below this size. The maximum limits of the average particle sizes of such titanium oxide and barium sulfate based on the surface diameters follow: (a) for the titanium oxide particles —0.49 micron (b) for the barium sulfate particles —0.47 micron. Furthermore the titanium oxide produced in accordance with the Svendsen procedure may be calcined to the crystallizing temperature without appreciable fritting of the particles thereby making it unnecessary to grind the pigment to the desired fine particle size after the calcining operation. This particular pigment also does not have a tendency to coalesce to any marked extent while in the dry condition. This is a distinct advantage since such a pigment may be more readily mixed to a uniform texture with the extender.

In the above referred-to Svendsen patent the titanium hydroxide (which is calcined to produce the titanium oxide used in this invention) is produced by reacting with ammonia a water solution of a purified titanium tetrafluoride compound and particularly an ammonium titanium tetrafluoride compound under such conditions that the hydroxide is produced. To use the maximum strength of titanium salt solution, this being desirable from a commercial standpoint to avoid high evaporation costs, the procedure that is customarily used for precipitation is reversed, the titanium tetrafluoride solution being poured into or added to the ammonia water so that there is an excess of ammonia present throughout the precipitation reaction. If the strength of the solution is not carefully regulated and the procedure as described is not followed crystals of a more or less complex titanium fluoride compound will form with the ammonia instead of the hydroxide. Although it is possible to treat these crystals with ammonia and water to produce the hydroxide this latter procedure prevents other difficulties which it is desirable to avoid.

The hydroxide produced as described and after being washed to remove excess fluoride salts is calcined at the crystallizing temperature which usually is in the neighborhood of 900° C. The water is first driven off of the hydroxide to form the oxide which in turn crystallizes at a still higher temperature. The anatase form is desirable in a titanium oxide pigment. The titanium oxide particles produced by the above described process do not have a tendency to frit together because materials which cause fritting are substantially absent. Materials which cause fritting in the oxide produced by the sulfate process may be alkali metal sulfates, for example, sodium sulfate or other sulfates such as basic titanium sulfate. The titanium hydroxide is very absorptive and this property makes it practically impossible to wash out these salts sufficiently enough to prevent fritting during the calcining operation. On the other hand the ammonium fluoride salts present during the Svendsen reaction although absorbed by the hydroxide and incompletely washed from the hydroxide are volatile at low temperatures and are removed from the hydrate at temperatures below a red heat. Fritting of the particles thereby is avoided during the calcining operation. After the hydroxide so produced is calcined it is only necessary to subject it to a short grinding operation principally to knock apart particles adhering to each other though not fritted together. A ball mill may be used though a roller mill with air separator is preferred. The resulting material consists of rounded particles of uniform size substantially all of which are below 0.50 micron.

The alkaline earth metal sulfate, for example, barium sulfate, is produced by any of the known commercial methods for producing sulfates, the precipitated barium sulfate being known to the trade as blanc fixe. The particles of blanc fixe are exceedingly small and in practically all instances over 60% are less than 0.30 micron. The barium sulfate so produced is blended or mixed mechanically with the titanium oxide by any of the known methods for producing such mixtures, for example, by means of a rubber lined or porcelain lined ball mill. Wet or dry mixing may be used. The resulting mixture is ready for use as a paint pigment. Such extended pigments usually contain from 20 per cent to 30 per cent of the titanium oxide although these may contain any proportion, for example, as low as 10 per cent of titanium oxide or as high as 40 per cent to 60 per cent. The tinting strength of such mixtures and particularly those containing 20 per cent to 30 per cent is better than that of a similar pigment in which the alkaline earth metal sulfate is precipitated onto the titanium oxide or vice versa.

It is also possible to mechanically mix the alkaline earth metal sulfate and the titanium oxide in the presence of water, that is, a wet mixing may be used. If wet mixing is resorted to the barium sulfate may be mixed with the wet titanium hydrate, for example, by wet grinding or mixing in a ball mill. The wet mixture is dried and calcined at the crystallizing temperature of the titanium oxide.

Because silicon fluoride compounds such as ammonium silicofluoride are soluble in water and since silicon compounds usually are present in titanium ores silicon hydroxide is co-precipitated with the titanium hydroxide if the silicon has not been removed from the ore. When the co-precipitated titanium and silicon hydroxides are calcined the silica is so intimately mixed with the titanium oxide that it cannot be distinguished under the microscope. Although the pigment particles produced thereby have many of the properties of the pure titanium oxide the crystallizing temperature of the titanium oxide is increased as the silica content increases. Such a pigment has certain characteristics which makes it desirable for particular uses. The alkaline earth metal sulfate extender also may be mechanically mixed with this co-precipitated pigment and the same advantages obtained as with the pure titanium oxide pigment. The co-precipitated pigment particle sizes are about equal to those of pure oxide. In the claims, therefore, when a titanium oxide pigment is referred to it includes a titanium oxide which contains limited amounts of intimately associated silica, usually not exceeding 10 to 15 per cent, the mixed titanium oxide and silica having been produced by the calcination of titanium and silicon hydroxides co-precipitated from tetrafluoride solutions as described.

I claim:

1. A pigment comprising a mechanical blend of 10% to 60% pigment $TiO_2$ and an alkaline earth metal sulfate, said pigment $TiO_2$ consisting of a crystallized $TiO_2$ produced by the calcining of a hydrate formed by the precipitation of a titanium tetrafluoride compound in water solution by means of ammonia, fritting materials being substantially absent in said reaction mass after precipitation of said hydrate is effected, said alkaline earth metal sulfate being produced by precipitation in water solution, the sizes of substantially all the individual particles of both the pigment $TiO_2$ and alkaline earth metal sulfate being less than 0.50 micron.

2. The pigment of claim 1 in which the alkaline earth metal sulfate is barium sulfate of which over 60% of the particles are less than 0.30 micron.

3. The pigment of claim 1 in which the blended pigment contains 20% to 40% of pigment $TiO_2$.

4. The pigment of claim 1 in which the blended pigment contains 20% to 40% of pigment $TiO_2$ and the alkaline earth metal sulfate is barium sulfate of which over 60% of the particles are less than 0.30 micron.

5. The pigment of claim 1 in which barium sulfate is used and in which the maximum limits of the average sizes of the titanium oxide and barium sulfate based on the surface diameters are 0.49 micron for the titanium oxide and 0.47 micron for the barium sulfate.

MAX H. KLIEFOTH.